United States Patent [19]

Glicksman et al.

[11] 4,007,288

[45] *Feb. 8, 1977

[54] LOW CALORIE SWEETENING COMPOSITION AND METHOD FOR MAKING SAME

[75] Inventors: Martin Glicksman, Valley Cottage, N.Y.; Bartley N. Wankier, Battle Creek, Mich.

[73] Assignee: General Foods Corporation, White Plains, N.Y.

[ * ] Notice: The portion of the term of this patent subsequent to Sept. 25, 1990, has been disclaimed.

[22] Filed: Aug. 13, 1973

[21] Appl. No.: 387,846

Related U.S. Application Data

[63] Continuation-in-part of Ser. No. 55,561, July 16, 1970, Pat. No. 3,761,288.

[52] U.S. Cl. .............................. 426/548; 426/658
[51] Int. Cl.$^2$ ......................... A23L 1/236
[58] Field of Search .......... 426/213, 215, 217, 384, 426/364, 443, 455, 456, 471, 548, 658

[56] References Cited

UNITED STATES PATENTS

| | | | |
|---|---|---|---|
| 3,492,131 | 1/1970 | Schlatter | 426/212 |
| 3,704,138 | 11/1972 | La Via et al. | 426/217 X |
| 3,761,288 | 9/1973 | Glicksman et al. | 426/217 X |

*Primary Examiner*—A. Louis Monacell
*Assistant Examiner*—Esther L. Massung
*Attorney, Agent, or Firm*—Daniel J. Donovan; Doris M. Bennett

[57] ABSTRACT

Readily soluble, sweetening compositions are produced by vacuum drum drying solutions of an edible bulking agent and a dipeptide sweetening compound.

3 Claims, No Drawings

LOW CALORIE SWEETENING COMPOSITION AND METHOD FOR MAKING SAME

RELATED APPLICATION

This application is a continuation-in-part of copending application Ser. No. 55,561 filed July 16, 1970 now U.S. Pat. No. 3,761,288, issued Sept. 25, 1973 entitled "Low Calorie Sweetening Composition And Method For Making Same."

BACKGROUND OF THE INVENTION

This invention relates to a readily soluble sweetening composition containing an edible bulking agent and a dipeptide sweetening agent and more particularly, it relates to methods of vacuum drum drying a low bulk density sweetening composition which results in a composition having extremely rapid solubility in water, and a bulk density and caloric value per unit of volume considerably less than that of sucrose.

Previous attempts to produce artificial sweeteners have involved the use of saccharins and/or cyclamates. In addition, problems have arisen with the use of these compounds, specifically, the saccharins which leave a somewhat bitter aftertaste in the mouth.

It has recently been found that certain dipeptide compounds possess an intense sweetness level. Examples of these compounds are set forth in U.S. Pat. Nos. 3,475,403 and 3,492,131. Most suitable among these compounds are the lower alkyl esters of aspartyl-phenylalanine wherein the stereochemical configuration is L—L, DL—DL, DL—L or L—DL. Illustrative of the lower alkyl esters are methyl, ethyl, propyl, butyl, pentyl, hexyl, heptyl and the branched chain groups isometric therewith, with the methyl ester being the most preferred embodiment.

These dipeptide materials would appear to have great commercial applications as sweetening agents since they range up to 200 times the sweetness level of sucrose, have no discernible unpleasant aftertaste, and can be produced from naturally occurring amino acids. Problems have arisen, however, with the use of these compounds in that their rate of solution into water is markedly slower than sucrose, and that the compounds tend to decompose, losing substantially all their sweetness upon heating at temperature above about 80° C.

SUMMARY OF THE INVENTION

It has now been found that the rate of solution of dipeptide sweetening compounds can be significantly increased by vacuum drum drying an aqueous solution of an edible bulking agent and the dipeptide sweetening compound. A superior composition is derived by modifying this procedure whereat an aqueous mixture of solid edible bulking agent and dipeptide sweetener is vacuum drum dried at controlled low temperatures, the resulting flakes when milled and graded for particle size being practically indistinguishable in appearance and behavior-in-use characteristics from granulated sucrose, and having a rate of solubility equal to or appreciably greater either a spray-dried or freeze-dried sample. Due to the absence of air in such a vacuum drum drying process, the resultant composition has not relinquished any sweetness or acquired any off taste which is sometimes apparent in samples having undergone at least partial degradation due to exposure to the air in other conventional drying processes. In addition, if the vacuum drum drying is conducted at controlled low temperatures, the density of the composition may be further reduced, thus allowing for the use of higher molecular weight bulking agents than would ordinarily be desired. Whether or not controlled low temperatures are utilized, vacuum drum drying of an aqueous solution comprises of a dipeptide sweetener and suitable bulking agents results in a dry sweetening composition which has a caloric value per unit of bulk less than sucrose, but a sweetness strength at least equivalent to the same. Vacuum drum dried products of this invention have the further distinct advantage of not foaming when incorporated in foods such as beverages.

The solid edible bulking agents suitable for use in this invention may be any of the non-toxic substances or combination of substances heretofore employed by the prior art for this purpose including the organic acids such as citric, adipic, fumaric acids, and the hydrolyzed starch materials such as dextrins and sugars. Especially suitable among these solid bulking agents are the dextrins particularly the lower dextrose equivalent (D.E.) dextrins of the class commonly known as corn syrup solids. These materials are preferred not only because they are low in caloric content and non-hydroscopic but also due to the fact that they have a low bulk density making it possible to produce a low calorie, low bulk density, non-hygroscopic sweetening composition which has the appearance of table sugar, will dissolve more rapidly than if freeze-dried, and, which on a per unit of bulk basis, has a sweetness intensity equivalent to sucrose.

It is an object of this invention to produce a low-calorie substitute for granulated sucrose.

It is a further object of this invention to produce a dipeptide-containing, low-calorie sweetening composition which has a rate of solution comparable to that of sucrose.

DESCRIPTION OF THE INVENTION

According to one embodiment of this invention, a table sugar substitute, having the appearance of crystalline sucrose and having a rate of solubility greater than if spray or freezedried, may be prepared by forming a uniform aqueous solution of a corn syrup dextrin material and a dipeptide sweetening agent and vacuum drum drying this solution in a manner so as to yield an expanded product which may then, if necessary, be ground to size. It is preferred that the vacuum drum drying process be conducted at controlled low temperatures not only because it serves to further reduce the bulk density of the composition, thus permitting use of higher molecular weight dextrins, but due to the fact that the dipeptide sweeteners of this invention tend to undergo partial degradation when exposed to increased temperatures. Thus, low temperature vacuum drum drying eliminates decomposition of the dipeptide sweetener and consequent probable flavor loss by providing a low temperature, air-free system. From a production standpoint, the absence of air increases the efficiency of the process in that foaming problems commonly associated with dry artificial sweeteners, when placed in solutions, are eliminated. Thus, the process of this invention which functions to dry aqueous dipeptide sweetening solutions at temperatures below 100° C is accomplished by introducing water at below boiling point, or vacuum steam, into the rolls of the vacuum drum dryer. The roll temperature of the drier may vary from about 24° C to almost 100° C with a preferred range of 40° C–80° C. The pressure within the vacuum chamber of the drum dryer should be maintained from 10 mm mercury to slightly below atmospheric pressure. It is preferred to maintain a vacuum of 50 mm to 400 mm mercury to insure low temperature drying and to properly degas the material being dried.

It should be obvious to those skilled in the art that any degree of evacuation which effected a product temperature on the rolls of the drum dryer apparatus which fall below the boiling point of water more preferably below 80° C is included in this invention. It should also be readily apparent to those skilled in the art that numerous apparent method modifications which are insignificant variances from the method hereinbefore described are intended for inclusion in this invention.

The dextrin material used for the production of these sugar substitutes must dissolve easily in water to produce a clear solution and must be non-hygroscopic. In this regard, the D.E. (dextrose equivalent) of the dextrin material has been found to be a critical parameter. The dextrin material must have a sufficiently low molecular weight to be easily soluble in water and to produce a clear solution so that the final product will have the essential reflecting surfaces in order to give the appearance of a crystalline product. On the other hand, the molecular weight of the dextrin material must be high enough so that hygroscopicity is avoided.

Accordingly, it has been determined that for the production of table sugar substitutes, the dextrin material should have a D.E. in the range of about 4 to 20 and preferably in the range of about 5 to 10. The 5 and 10 D.E. dextrins are particularly preferred where these bulking agents are combined with an organic acid bulking agent such as citric acid since these dextrins are the most stable when combined with acids. Additionally, it has been found that the best results are obtained if the dextrin material contains little or no monosaccharide (i.e. glucose) and contains an irregular distribution of the other lower (one to eight saccharide units) saccharides with a preponderance of the hexamer and heptamer. Such corn syrup dextrins have been produced by means of enzymatic hydrolysis of starch and are typified by the products available from CPC under the name Mor-Rex.

The processes of this invention are further illustrated but not limited by the following examples:

EXAMPLE 1

A solution was prepared containing 800 grams of water (80° F), 241 grams of 5 D.E. Mor-Rex and 5.95 grams of L-aspartyl-L-phenyl-alanine methyl ester. This solution was placed in a tray at a 1.5 inch thickness and freeze dried in a Stokes Freeze Dryer for 48 hours. The material was then ground to a fine powder using a Waring Blender at a high speed.

EXAMPLE 2

A solution was prepared according to the method of Example 1 and this solution was drum dried at a temperature of 130° C on a drier operating at 25 lbs. sq. in. and 6.25 rpms. A similar solution to the above is vacuum drum dried at similar conditions using a drum temperature of 38° C at a pressure of 50 mm mercury.

EXAMPLE 3

A solution containing 384.05 grams of water, 241 grams of 5 D.E. Mor-Rex and 5.95 grams of L-aspartyl-L-phenylalanine methyl ester was prepared. This solution was then spray-dried in a Niro Spray Dryer at an air pressure of 5.2 kg/sq.cm, an air inlet temperature of 160° C, an air outlet temperature of 75° C and a rate of solution flow of 15 cc/min.

Equal weight samples of the sweetening compositions of Examples 2 and 3 were dissolved in coffee samples and were organoleptically determined to have substantially equivalent sweetness levels. This sweetness level is not found to significantly differ from control coffee samples containing an equal amount of the untreated dipeptide material, thus indicating the absence of any degradation of the dipeptide material during the drying operations. However, the absolute solubility and rate thereof were substantially improved.

The solubility rate of the powders from Examples 2 and 3 was evaluated by recording the times required for complete solution of 1.5 gram samples of these powders (containing about 0.036 grams of sweetener) into 170 ml. of water at a temperature of 40° F, with stirring. The results are summarized in the table below:

|  | 40° F (time in seconds) |
|---|---|
| Example 1 | 62 |
| Example 2 | 40 |
| Example 3 | 60 |

When 0.036 gram samples of L-aspartyl-L-phenyl-alanine methyl ester are sought to be dissolved in 170 ml of water at 40° F, with stirring, average times for complete solution run about 30 minutes.

Additional tests have shown that varying the level of dipeptide in the sweetening compositions up to the level of about one part dipeptide per part of bulking agent, does not have any appreciable or predictable effect on the rate of solution. All samples prepared in accordance with this invention were found to dissolve in water as cold as 40° F in less than 2 minutes, whereas complete solution of equivalent amounts of the dipeptide material taken along requires a time of about 30 minutes.

It has also been found that the reduced temperatures, below about 100° C, which are employed during the controlled low temperature vacuum drum drying operations do not effect the sweetness of the final product, and serve to further decrease the density of the resultant product as well as further improved the rate of solubility. Furthermore, no foaming of aqueous solution is noticed when using this product.

The bulk density of the final sweetening composition can be controlled by varying the solids concentration of the solution prior to drying. The bulk density may also be controlled by changing the method of drum drying, by varying the rate of drying, or by varying the conditions of vacuum under which the solution is dried. Bulk densities ranging as low as about 0.04g/cc can be obtained by the process of the instant invention.

The addition of a small amount of an anti-caking agent such as tricalcium phosphate may also be used to adjust the bulk density of the final product.

Thus by exercising proper control over the process, it is possible to produce a final product which has substantially the same bulk density of granulated sucrose or a product which has a much lower bulk density than granulated sucrose but which, by adjusting the level of dipeptide sweetening compound, has on a volume basis the same level of sweetness as sucrose but a far less caloric value.

EXAMPLE 4

Four grams of dextrin having a D.E. of 10 and three grams of L-aspartyl-L-phenylalanine methyl ester are dissolved in 100 ml of water and maintained at 115° F. The solution is mixed at this temperature until it loses its milky appearance and becomes essentially clear.

Prior to introducing the feed solution into the vacuum drum dryer itself, ambient temperature water is circulated through the rolls of the drum dryer and the chamber evacuated to about 24 mm Hg pressure, the water then having a temperature of 24° C. When the solution is completely dry, the material is removed from the chamber and particulated by passing it through a 20 mesh screen.

It will be apparent that there are variations and modifications of this invention and that the proportions, ingredients and typical operating conditions may be varied without departing from the scope of the invention.

Having thus described the invention, what is claimed is:

1. A method for producing a rapidly soluble sweetening composition comprising the steps of forming an aqueous solution of an edible bulking agent and L-aspartyl-L-phenylalanine methyl ester, said bulking agent being selected from the group consisting of organic acids, hydrolyzed starch materials and sugars, said aqueous solution containing less than one part L-aspartyl-L-phenylalanine methyl ester per part of bulking agent, and vacuum drum drying the solution at a drum temperature below 100° C and at subatmospheric pressure.

2. The method of claim 1 wherein the bulking agent is a dextrin having a dextrose equivalent of 4 to about 20 and wherein the drum temperature is maintained at 40° C–80° C and the pressure is 50–400 mm mercury.

3. The method of claim 1 wherein the bulking agent is a dextrin having the dextrose equivalent from about 5 to about 10, contains little monosaccharide and contains, an irregular distribution of other lower saccharides with a preponderance of the hexamer and heptamer.

* * * * *